Jan. 25, 1955 R. W. ALLEN 2,700,297
DRAWBAR FOR SKID TEST DYNAMOMETERS
Filed Feb. 25, 1950 2 Sheets-Sheet 1
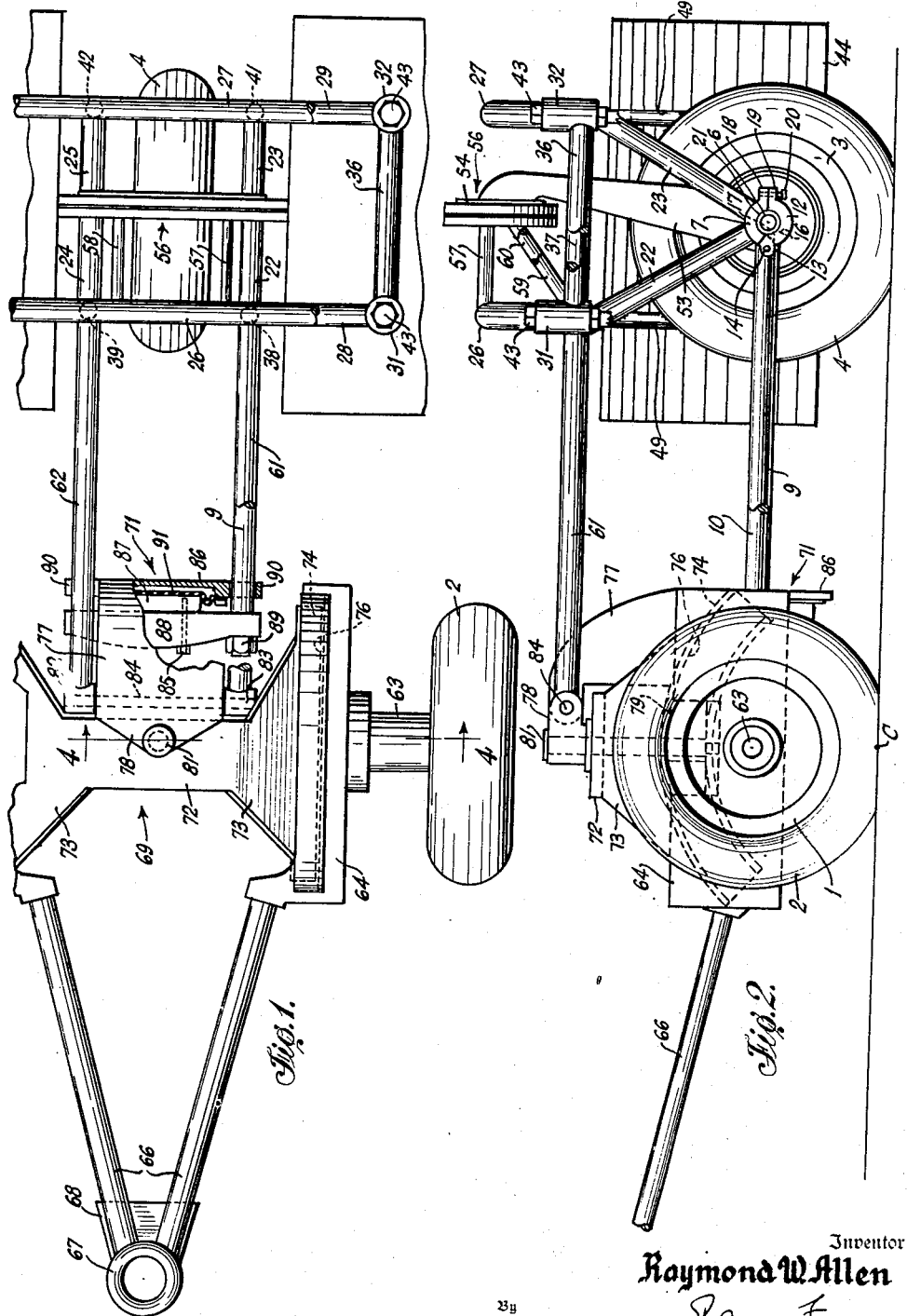
Inventor
Raymond W. Allen
By Ely & Frye
Attorneys Jan. 25, 1955  R. W. ALLEN  2,700,297
DRAWBAR FOR SKID TEST DYNAMOMETERS
Filed Feb. 25, 1950  2 Sheets-Sheet 2

Inventor
Raymond W. Allen
Attorneys

2,700,297

DRAWBAR FOR SKID TEST DYNAMOMETERS

Raymond W. Allen, Akron, Ohio, assignor to The Firestone Tire & Rubber Company, Akron, Ohio, a corporation of Ohio Application February 25, 1950, Serial No. 146,350

8 Claims. (Cl. 73—9)

This invention relates to towing means for devices employed in the skid testing of tires.

In the conventional practice, a tire is mounted on a single-wheeled trailer, which is pulled by an ordinary towbar, the effective pull being applied at the axle of the trailer. In such tests, the coefficient of friction is determined as the ratio of the drawbar pull to the total weight supported by the test tire, and the test trailer is usually heavily loaded to simulate actual conditions of tire use on vehicles.

Although in these tests, the determinations of precise values of loads have been painstaking in the interest of precision, I have found that a serious error, variable within relatively large limits, has always been present due to a difference between the apparent weight on the tire and the weight actually overcome in the skid test. This error arises from the fact that the drawbar pull is through the trailer axle, whereas the drag is along the ground level. These vertically spaced forces give rise to a force couple, which is overcome by a portion of the weight applied to the tire. Thus the weight supported by the tire, as statically determined does not correspond to the weight actually entering into the opposing of the drag along the ground and, if the apparent value of the weight is used in computations, the results will be in error corresponding to the amount of what might be called "lost weight," which is subtracted in overcoming the above-mentioned couple.

According to the present invention, this difficulty is overcome by a drawbar arrangement which shifts the drawbar pull to ground level, so that no force couple arises in the skid.

It is, therefore, an object of the invention to improve the accuracy of test results in the skid-testing of tires. A further object is to fully employ the rated weight carried on test tires in skid-testing thereof. More particularly, it is an object to provide a novel drawbar pull arrangement wherein the effective line of pull is at ground level. Yet another object is to avoid, in a drawbar arrangement, force couples between the drawbar and the ground support of a vehicle.

These and other ends are attained by the invention, one preferred embodiment of which is described in the following specification and illustrated in the drawings, in which:

Fig. 1 is a top plan view of a portion of a skid-test trailer.

Fig. 2 is a side view of Fig. 1, showing the rear portion thereof on the line 2—2 of Fig. 3.

Figure 3:
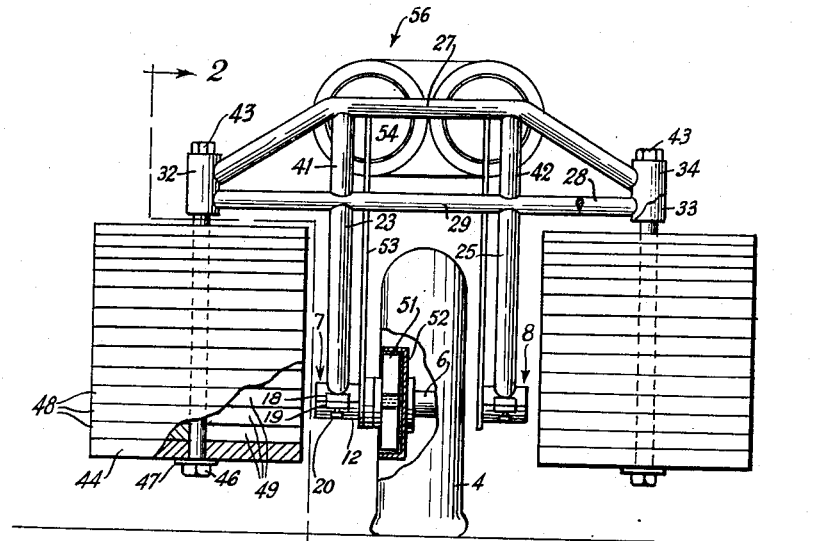
Fig. 3 is an end view of Fig. 1, looking at the rear of the vehicle.
Figure 4:
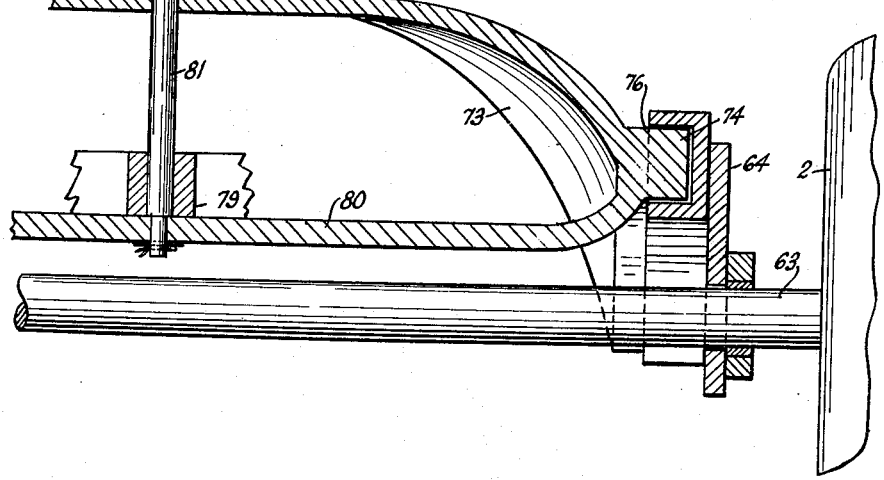
Fig. 4 is a sectional view, enlarged, taken along the line 4—4 of Fig. 1.

Referring to the drawings by characters of reference, there is shown a trailer having a pair of front wheels 1 (of which only one is shown), having tires 2, and a single, rear wheel 3, mounting a tire 4 to be tested for skid properties. Rear wheel 3 is mounted on an axle 6, between a pair of similar bushings 7, 8 supporting the rear portion of the trailer framework. These bushings are preferably of the split type to facilitate removal of wheel 3 for tire replacement. The upper halves of these bushings are welded to respective tubes 9, 10 of the framework leading to the front of the trailer. As seen in Fig. 2, bushing 7 has a lower half 12 with a pair of ears 13 pivotally mounted on a pin 14 passing through tube 9. Lower half 12 has a slot of a width equal to the distance between ears 13 so that it may clear tube 9 in its swing. The bottom of this slot is indicated at 16. The top of bushing 7 has a reduced width to accommodate ears 13 in the closed position of lower half 12, and the terminus of the top portion in this region is indicated by the dotted line 17. The bushing parts have lips 18, 19, the former being suitably threaded to receive a locking screw 20. A bearing sleeve 21, in which shaft 6 is rotatable, is gripped by bushing elements 7, 12.

Pairs of support elements 22, 23 and 24, 25, each in V-form, are welded to the respective, upper parts of bushing elements 7 and 8, and support a pair of trusses, comprising, respectively, upper, tubular members 26, 27 and lower, tubular members 28, 29, the ends of the members having secured thereto vertical sleeves 31, 32 and 33, 34 and the trusses being joined by tubular members 36, 37 attached to the said sleeves. Upper truss members 26, 27 are of generally arch form and their central spans are supported on tubes 38, 39 and 41, 42. It will be understood that all parts of the tubular framework in the vehicle will, conveniently, be attached as by welding.

The vertical sleeves at the truss corners carry bolts 43, each pair of which supports, on one side of test wheel 3, a platform 44, by means of nuts 46 and washers 47. Weights 48 have slots 49 whereby they are adapted to be slipped over bolts 43, so that weight to the desired amount may be imposed on the platform, and through the trusswork and axle to test tire 4.

Skidding of the tire is accomplished through a brake, imparting force to a force-testing device. Such device may be of any conventional nature and in the example shown there is employed what is known as an "Emery capsule," employed in duplicate on opposite sides of the test wheel. Only one brake system need be described. A brake shoe, indicated generally by the numeral 51 is freely rotatable on axle 6 and coacts with a brake drum 52 attached to test wheel 3. Brake shoe 51 carries an upright arm 53, having on its upper end a piston 54 forming part of a force-measuring device indicated generally by the numeral 56, and which need not be described in detail. Element 56 is supported on the trusswork by a pair of horizontal, tubular braces 57, 58 and a pair of diagonal, tubular braces 59, 60. A pair of tubes 61, 62 are attached to the lower element 28 of the front truss and are attached to the front bogie of the trailer in a manner to be described.

In the prior practice, the drawbar pull would be directly applied to a structure as above described. However, according to the present invention, a front bogie is employed and this provides for a novel connection between the drawbar and the test wheel unit.

Front wheels 1 are mounted on an axle 63. Also rotatably mounted on axle 63 are a pair of castings 64. As in the case of the rear assembly, only one side of the front system need be described. Attached to castings 64 is a V-bar 66, and an eyelet 67 attached thereto by a skirt 68 serves to receive a pintle for coupling the trailer to a towing vehicle.

All four tubes 9, 10, 61, 62 are connected to a unit coupled with casting 64 and indicated generally at 69, which unit includes a force-measuring device, indicated generally at 71, for measuring drawbar pull.

Unit 69 comprises an upper, bridge element 72 extending between castings 64 and having outwardly and downwardly slanted, flared aprons 73. The latter each have an outward, arcuate rib 74 engaged in a complementary channel 76, secured to the inner side of casting 64 for sliding motion therealong. The common center of curvature of the rib and channel is preferably at a point C on the ground directly beneath the center of axle 63.

A casting 77 has ears 78, 79 lying above and below the bridge 72 and pivoted on a vertical pin 81 passing through a bore in bridge 72, and through a cross plate 80 connecting ribs 74. Upper tubes 61, 62 have bushings 82, 83 on their ends which are mounted on the ends of a shaft 84 carried in casting 77.

Casting 77 has a vertically depending, plate portion 86 which serves as one of two movable elements of a force measuring device, the other movable element 87 being bolted to a beam 88 which is secured by nuts 89 on the threaded ends of main frame tubes 9 and 10, the latter being slidable in bores in a pair of ears 90 on plate portion 86. The fluid-retaining diaphragm of the force-measuring device is indicated at 91.

In a conventional single wheel trailer the drawbar is attached to a single test wheel with a pintle connection through a ring such as 67. Any pull on the wheel is manifest in an arcuate swing of "lift" of the wheel about the pintle. For example, in a coefficient of friction test when a drawbar pull is exerted at 67 the force of pull gives rise to a couple about the pintle ring which is well above the ground. This couple tends to lift the wheel off the ground. The effect is to reduce the effective weight on the contact area of the tire on the ground or "unload" the wheel. Consequently, when using a known weight on the wheel and using the force of drawbar pull to calculate the coefficient of friction of the tire on the wheel, a false coefficient of friction is obtained because the effective weight on the wheel is not truly the weight originally loaded on the wheel before pull. The effective weight is less than the apparent weight which throws an error into the coefficient of friction determination.

If the drawbar pull could be applied to pintle ring 67 in the plane on which the wheel contacts the ground, there would be no couple about the pintle ring and no force tending to unload the test wheel. However, it is impractical to apply the drawbar pull at ground level. The structure of the present invention obtains the same result. By designing a groove 76 fitted with rib 74 as the sole surface of force transmission between a front bogie axle 63 and rear wheel 4 on the circumference of a circle the radius of which intersect at a common point on the ground and attaching a rigid drawbar 66 between the front bogie axle 63 and the pintle of the prime mover, the unloading effect on the rear wheel 4 is eliminated. With this structure it will be seen that as the prime mover pulls forward, the pull is transmitted through the drawbar 66 and block 64 to the arcuate surface of groove 76 and rib 74 which because of its geometry concentrates the pull at the point "C" through which the radial lines from the arcuate cam 74 intersect on the plane of the ground. This point on the ground tends to rotate counterclockwise around the pintle ring 67 and thereby unload the front bogie axle 63. Therefore sufficient weight must be on the front bogie axle to hold it on the ground. Under these conditions there is no force counterclockwise around the pintle ring 67 to unload the rear wheel 4 and the effective weight on the rear wheel is the actual weight of the load 44. Since the weight 44 on the rear wheel is also the effective weight at the time of pull by the prime mover, a true coefficient of friction is obtained.

The linkage shown has a tendency to lift the front bogie, but the castings in this unit are of sufficient weight to counteract this tendency.

Other forms than the rib and groove connection may be employed. For instance, the rib may be replaced by a plurality of rollers. Also, the slot 76 may be of less extent than that shown and need only be of an extent to accommodate the ribs or rollers employed for the maximum travel thereof expected.

While the effective center of pull has been shown at the ground line, this may vary within limits while still affording test results with considerably less error than has heretofore been the case. In other words, any lowering of the effective line of pull below the axle of the test wheel is an improvement.

The pivoting on vertical pin 81 is provided to minimize lateral forces on the test tire, while the horizontal pivoting on pin 84 gives a flexibility to the framework to compensate for relative motion in the force-measuring device 71.

In general, whereas a certain preferred embodiment of the invention has been shown and described, changes may be made in the size, shape, or arrangement, for instance, of the various parts without, however, departing from the spirit or scope of the appended claims.

What is claimed is:
1. A trailer vehicle assembly comprising a front bogie and a rear bogie, and a framework connecting said bogies, said front bogie comprising an element having pulling engagement with an element on said framework, and said elements providing the sole pulling engagement between the front and the rear bogies and having sliding interengagement along a circular path with its center closely adjacent the ground surface.

2. A trailer assembly for vehicles comprising a front bogie and a rear bogie, and a framework connecting said bogies, the main drawbar pull between said framework and front bogie being provided solely by structure comprising interconnecting elements transmitting the total drawbar pull and having relative sliding motion along a path, the normals to which intersect at a common point closely adjacent the ground surface.

3. A trailer assembly for vehicles comprising a front bogie and a rear bogie, and a framework connecting said bogies, said framework and front bogie including interconnecting elements forming the sole means of force transmission therebetween, one of said elements comprising means defining at least one groove defining a curve which is equidistant at all points from a point near the ground surface which lies vertically below the axle of the front bogie, and the other of said elements comprising a member slidable along said groove.

4. A trailer assembly comprising a front bogie having an axle, a rear bogie, and a framework connecting said bogies, solely by interengaging means substantially above the ground and having relative motion along a path concentric about a point vertically below said axle and closely adjacent the ground surface.

5. A skid test device for wheels comprising a front bogie having an axle and wheels and including a tow bar, a rear bogie having an axle for mounting a test wheel, a force measuring device and a framework, said framework connected at one end to the rear bogie and at the other end to the force measuring device, the force measuring device connected to the front bogie, the sole pulling connection between said front bogie and said force measuring device comprising means engaging in sliding engagement about a center vertically below the axle of the front bogie and closely adjacent the ground.

6. A device as in claim 5, said force measuring device comprised of a first plate and a second plate parallel to at least part of said first plate, the framework having an upper unit connected to the first plate and a lower unit slidably connected to the first plate and connected to the second plate, and said first plate connected to the front bogie.

7. A device as in claim 5, said force measuring device comprised of a first plate and a second plate parallel to at least part of said first plate, the framework having an upper unit connected to the first plate and a lower unit slidably connected to the first plate and connected to the second plate, and a vertical pintle connecting the first plate to said front bogie whereby horizontal forces other than forward applied to said front bogie are isolated from said test wheel.

8. A device as in claim 5, said force measuring device comprised of a first plate and a second plate parallel to at least part of said first plate, the framework having an upper unit connected to the first plate and a lower unit slidably connected to the first plate and connected to the second plate, a horizontal pintle connecting the upper unit to the first plate and a vertical pintle connecting the first plate to the front bogie, whereby horizontal and vertical forces applied to the front bogie are isolated from said test wheel.

References Cited in the file of this patent
UNITED STATES PATENTS

| Number | Name | Date |
|---|---|---|
| 2,432,739 | Ferguson | Dec. 16, 1947 |
| 2,438,553 | Fraga | Mar. 30, 1948 |